(12) United States Patent
Kim

(10) Patent No.: US 7,548,415 B2
(45) Date of Patent: Jun. 16, 2009

(54) PORTABLE DISPLAY DEVICE

(76) Inventor: Hi-San Kim, 338-1, Daessangyong-Ri, Choweol-Myun, Kwangju-Kun, Kyunggi-Do (KR) 464-862

( * ) Notice: Subject to any disclaimer, the term of this patent is extended or adjusted under 35 U.S.C. 154(b) by 247 days.

(21) Appl. No.: 11/597,921

(22) PCT Filed: May 31, 2005

(86) PCT No.: PCT/KR2005/001623

§ 371 (c)(1),
(2), (4) Date: Nov. 28, 2006

(87) PCT Pub. No.: WO2005/119409

PCT Pub. Date: Dec. 15, 2005

(65) Prior Publication Data

US 2008/0049389 A1 Feb. 28, 2008

(30) Foreign Application Priority Data

Jun. 1, 2004 (KR) .................. 10-2004-0039648

(51) Int. Cl.
*G06F 1/16* (2006.01)
(52) U.S. Cl. .................. 361/679.27; 455/566; 345/1.1
(58) Field of Classification Search .................. 361/681
See application file for complete search history.

(56) References Cited

U.S. PATENT DOCUMENTS

| | | | | |
|---|---|---|---|---|
| 5,657,370 A * | 8/1997 | Tsugane et al. | ............. | 455/566 |
| 6,262,785 B1 * | 7/2001 | Kim | ............. | 349/58 |
| 6,327,482 B1 * | 12/2001 | Miyashita | ............. | 455/566 |
| 6,421,231 B1 | 7/2002 | Jung | ............. | 361/681 |
| 6,643,124 B1 * | 11/2003 | Wilk | ............. | 361/681 |
| 6,665,174 B1 | 12/2003 | Derr et al. | ............. | 361/681 |
| 6,930,881 B2 * | 8/2005 | Karidis et al. | ............. | 361/683 |
| 6,970,210 B2 * | 11/2005 | Kim et al. | ............. | 349/58 |
| 7,032,984 B2 * | 4/2006 | Kim et al. | ............. | 312/7.2 |
| 2003/0189759 A1 * | 10/2003 | Kim et al. | ............. | 359/619 |
| 2005/0219807 A1 * | 10/2005 | Kim | ............. | 361/681 |
| 2005/0248501 A1 * | 11/2005 | Kim | ............. | 345/1.1 |
| 2007/0164923 A1 * | 7/2007 | Kanai et al. | ............. | 345/1.1 |
| 2008/0062625 A1 * | 3/2008 | Batio | ............. | 361/680 |

FOREIGN PATENT DOCUMENTS

| | | | |
|---|---|---|---|
| JP | 1993-71954 | * | 9/1993 |
| JP | 1997-311737 | * | 12/1997 |
| KR | 2001-55072 | * | 7/2001 |
| WO | WO 03/065184 | | 8/2003 |

OTHER PUBLICATIONS

"International Search Report", PCT/KR2003/01888.*

* cited by examiner

*Primary Examiner*—Lisa Lea-Edmonds
(74) *Attorney, Agent, or Firm*—Westman, Champlin & Kelly, P.A.

(57) ABSTRACT

The present invention is directed to a portable display device having panel housings for receiving and supporting at least two display elements, circuit boards and other parts, respectively. One sidewall of the panel housings are cut to form an cutting zone, so that an opposite sidewalls of the display elements may be adjacently disposed each other when the panel housings are unfolded. The portable display device allows a single large sized screen, and whereby a joint portion between the two display panels as non-display area may be minimized.

9 Claims, 12 Drawing Sheets

[Fig. 1]
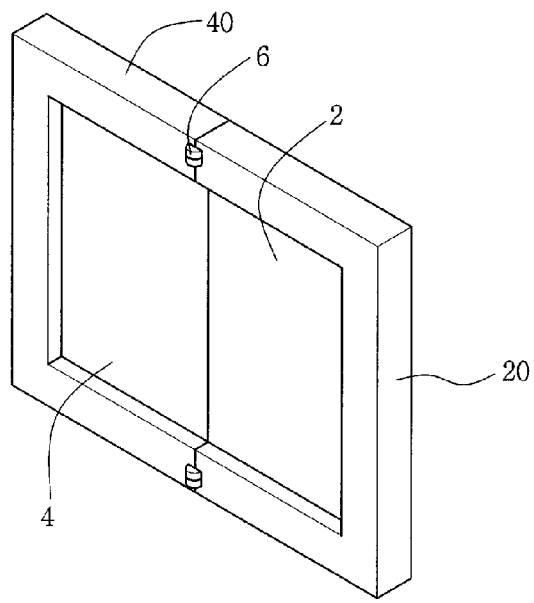
[Fig. 2]
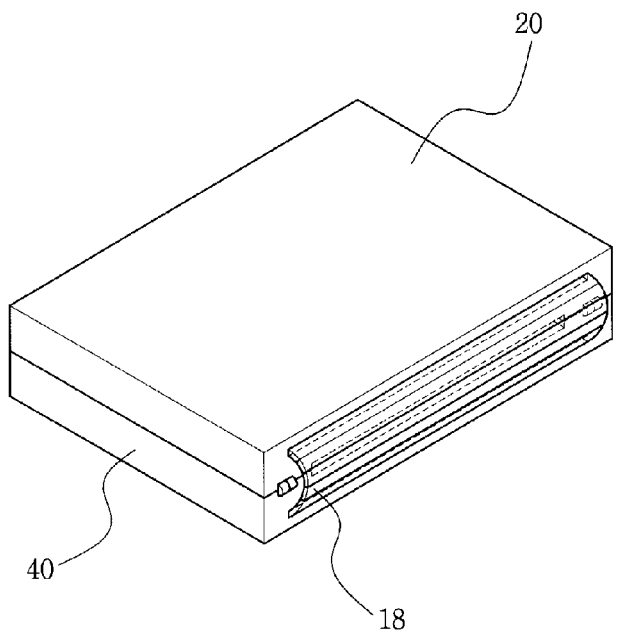
[Fig. 3]
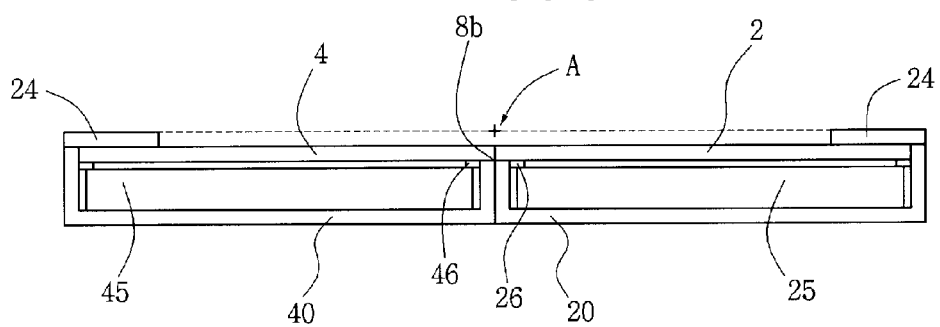

[Fig. 4]
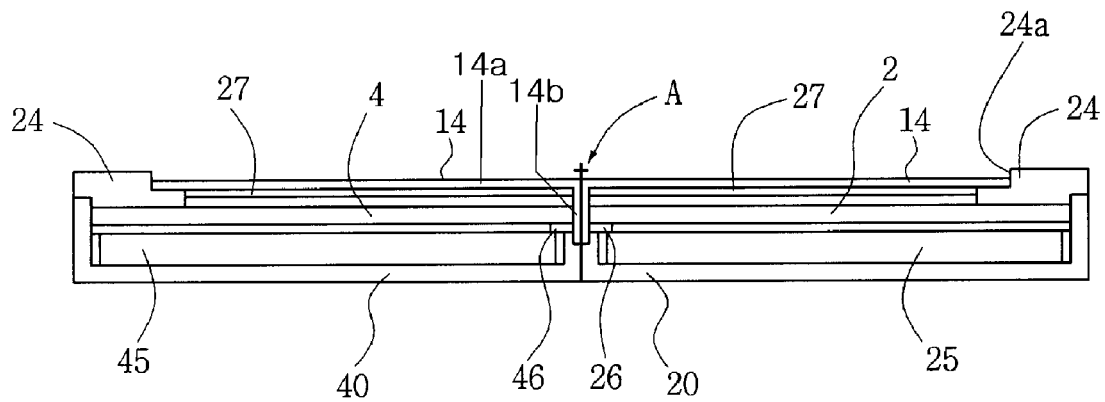
[Fig. 5]
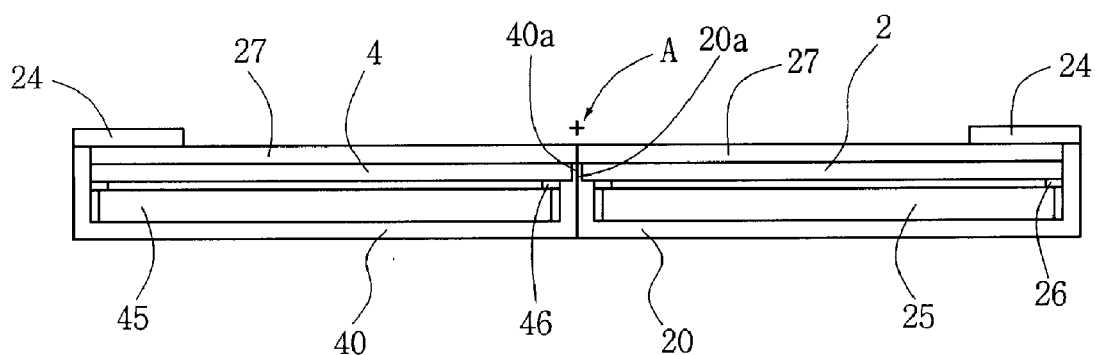
[Fig. 6]
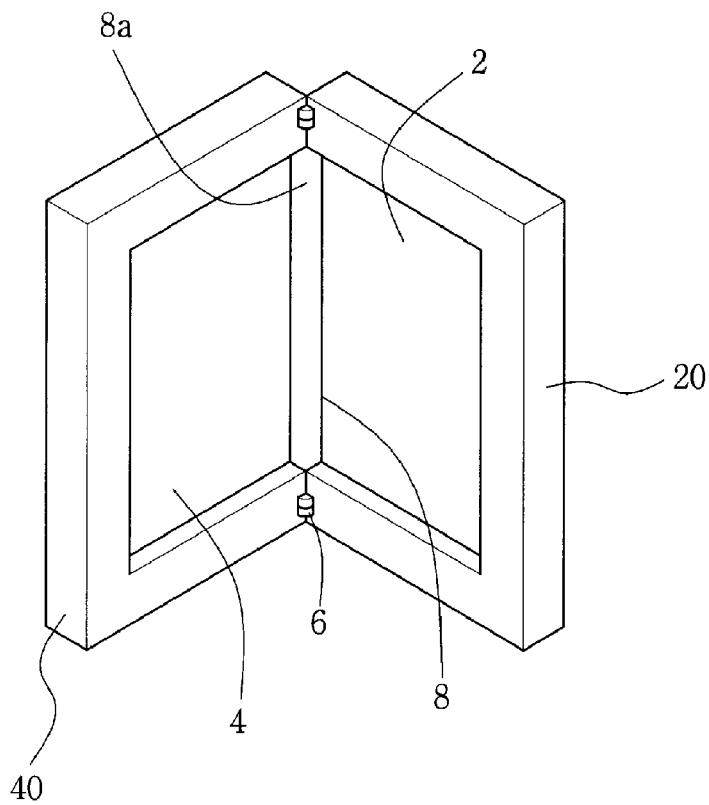

[Fig. 7]
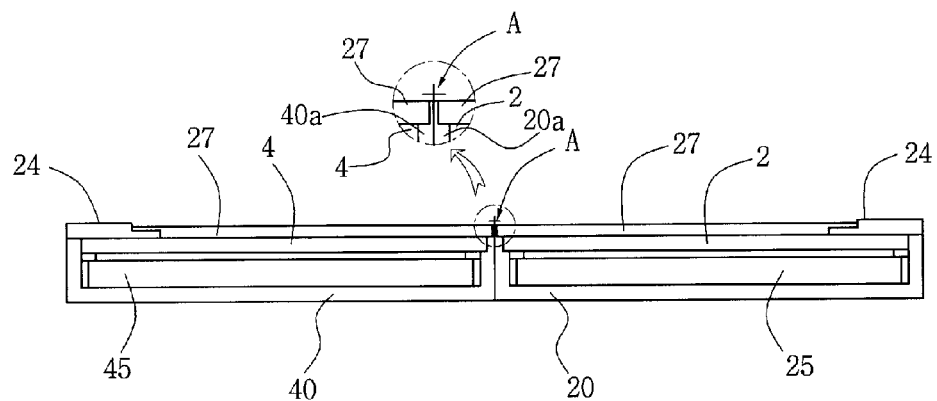
[Fig. 8]
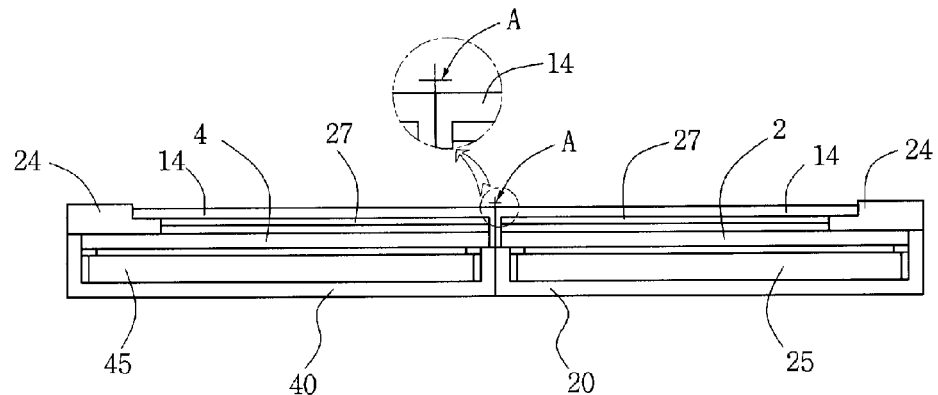
[Fig. 9]
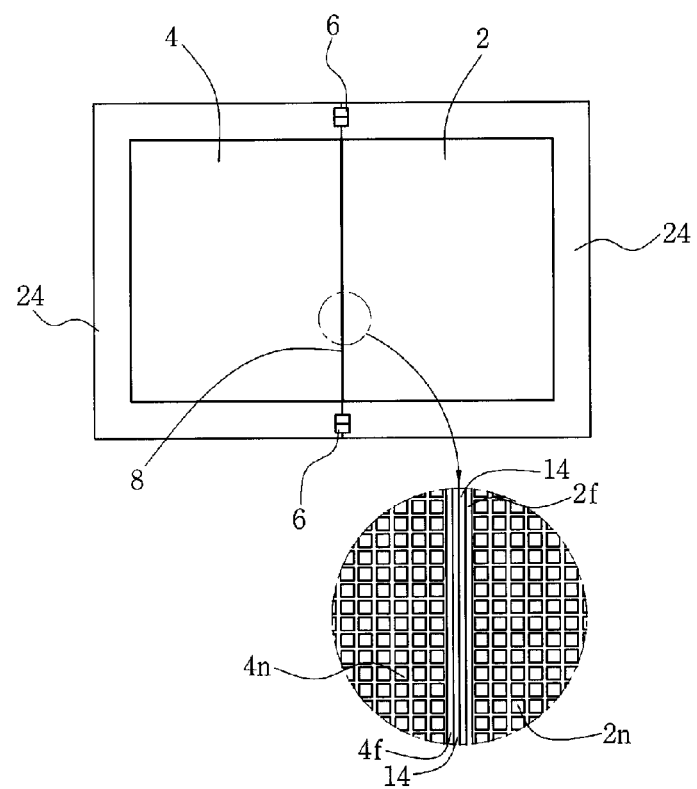

[Fig. 10]
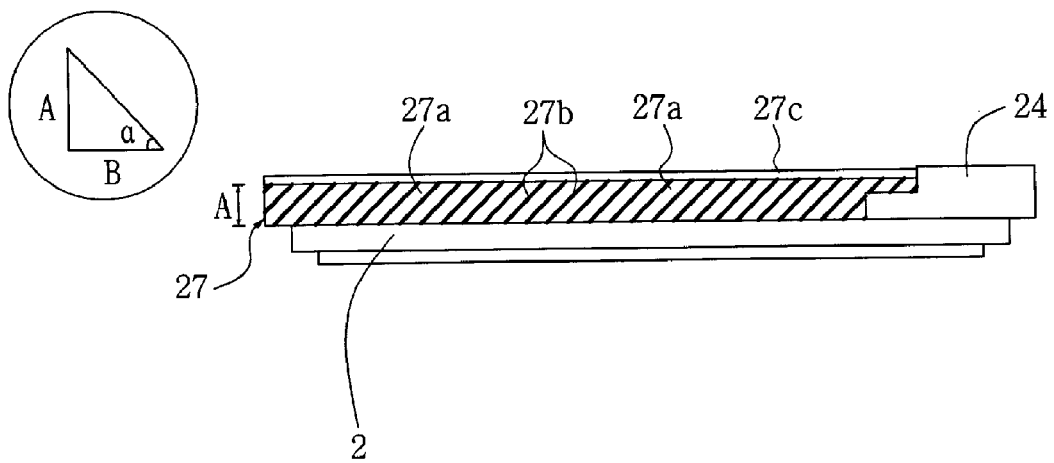
[Fig. 11]
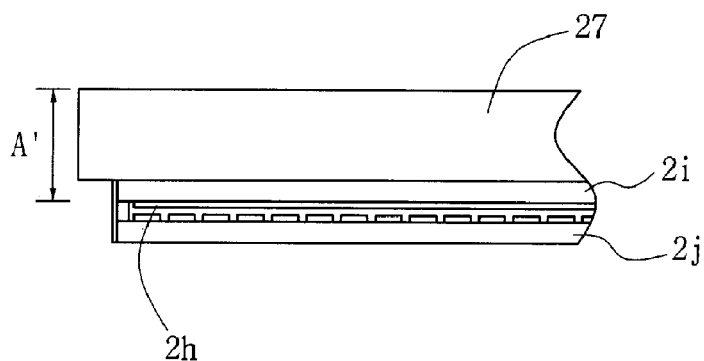
[Fig. 12]
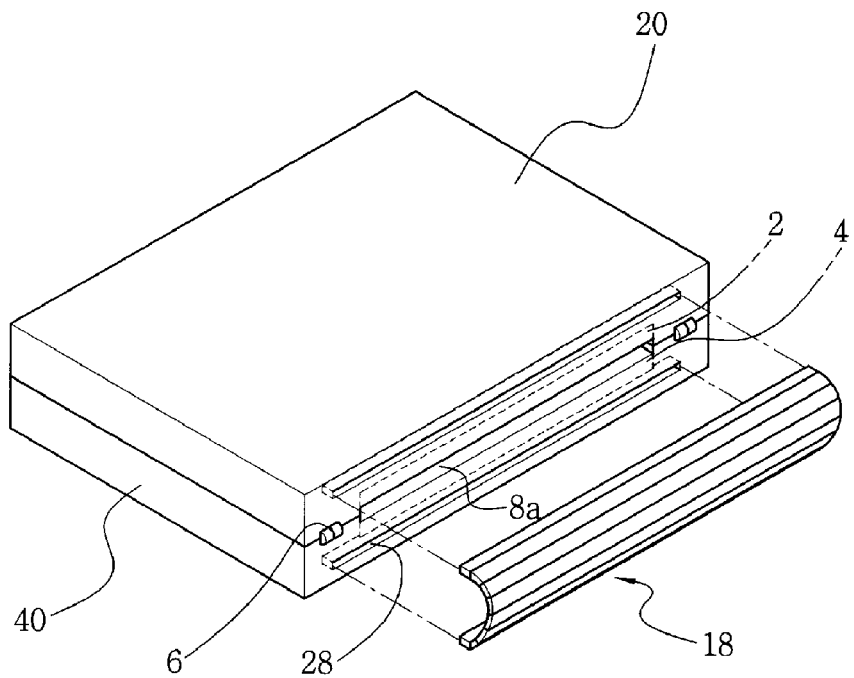

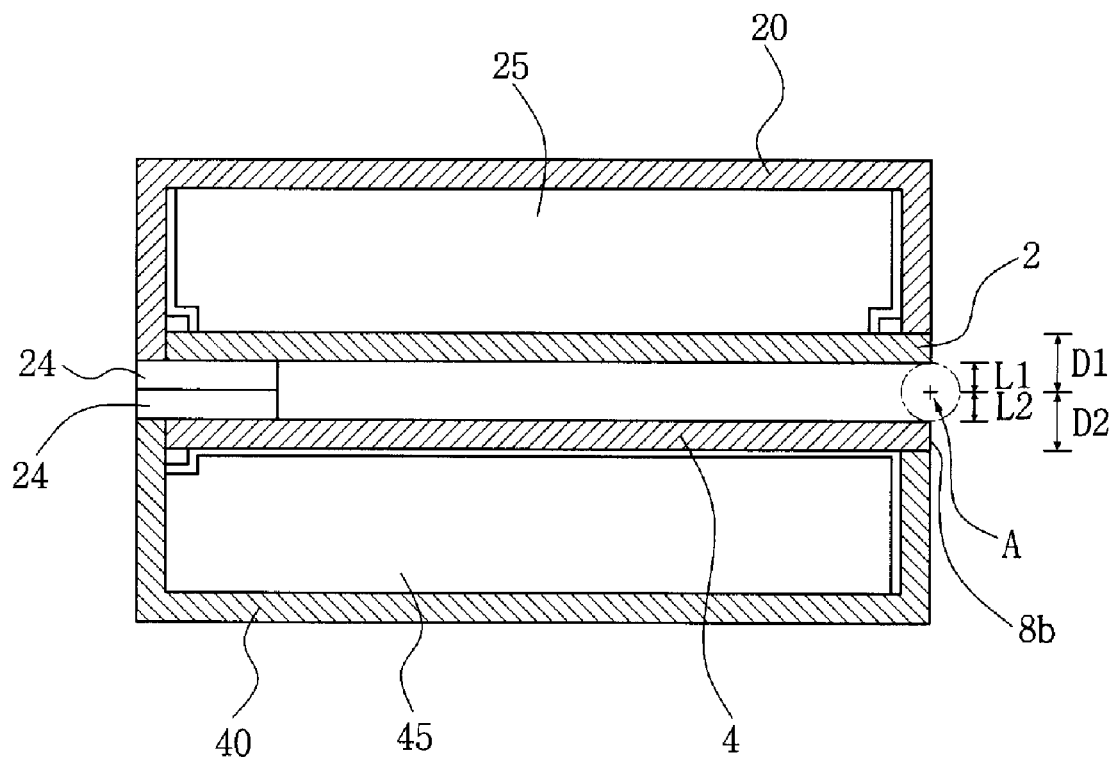
[Fig. 13]
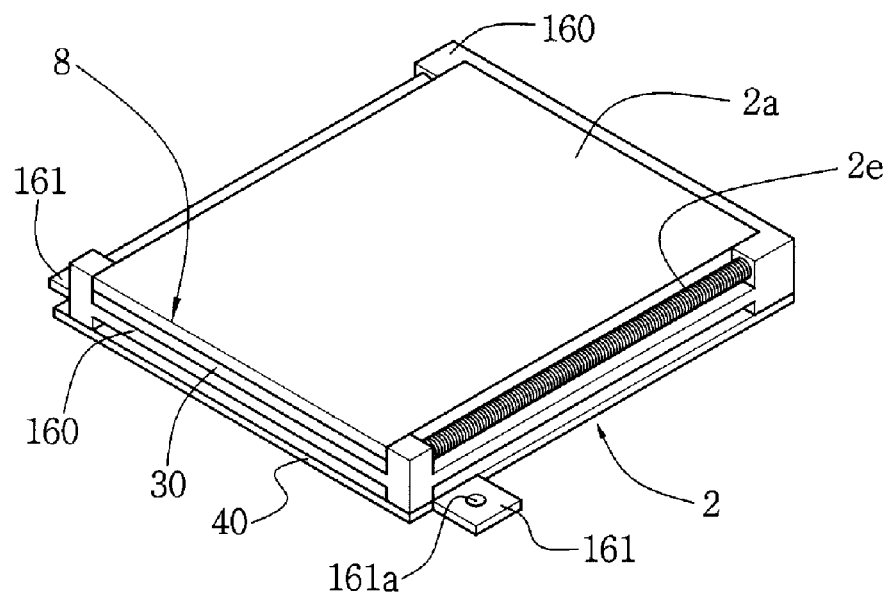
[Fig. 14]

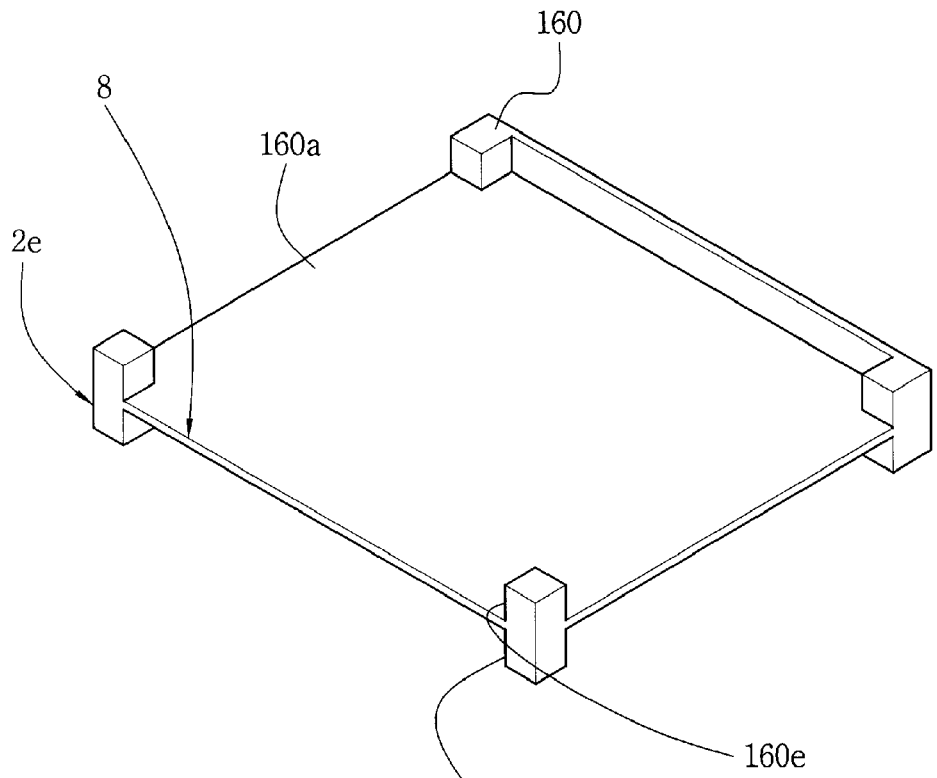
[Fig. 15]
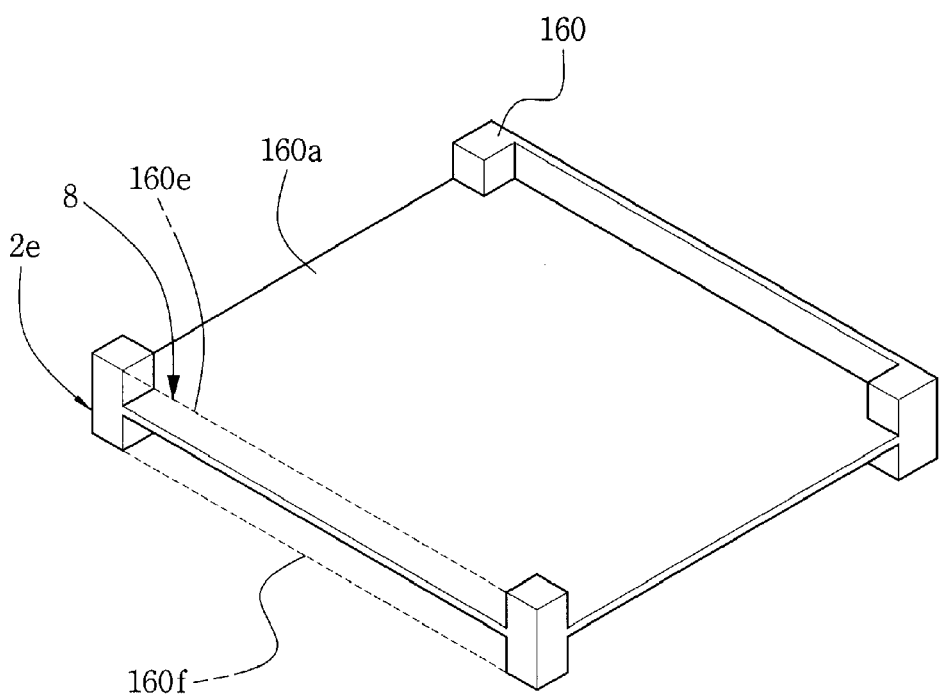
[Fig. 16]

[Fig. 17]
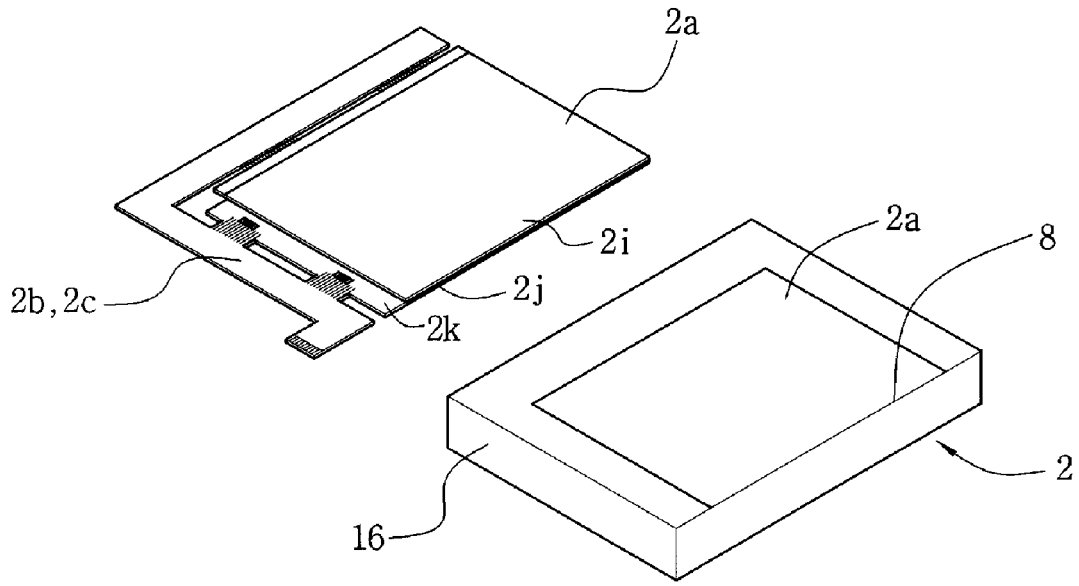
[Fig. 18]
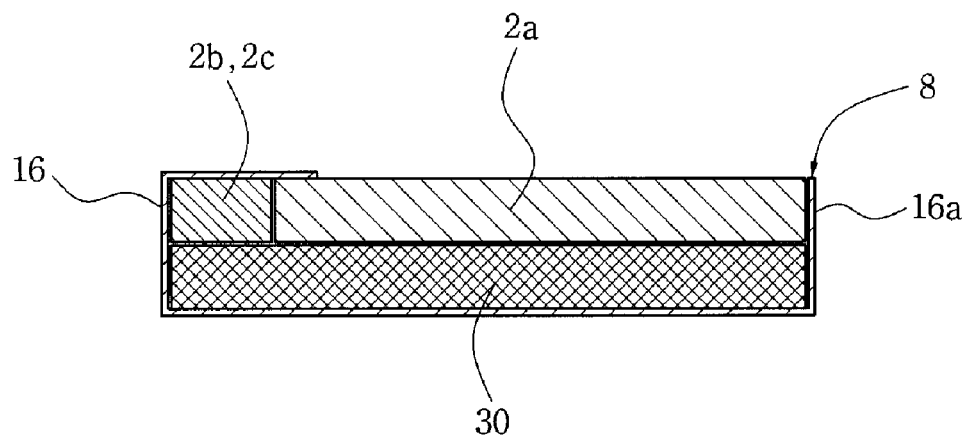
[Fig. 19]
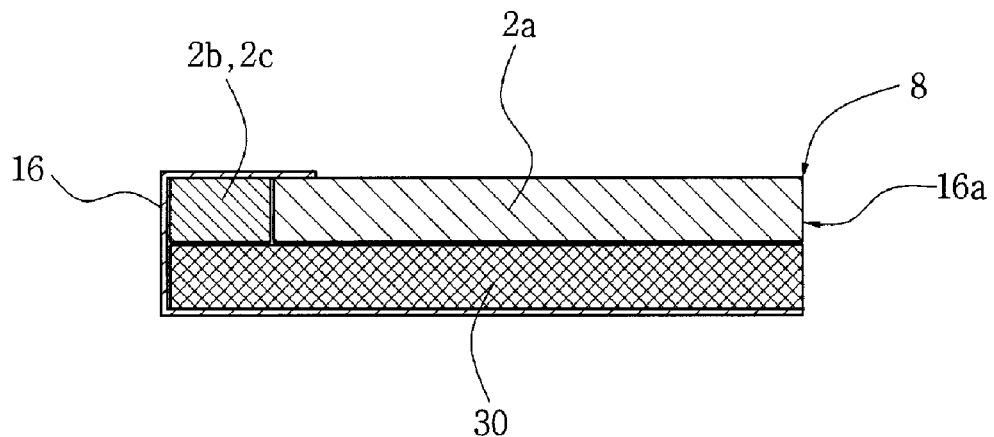

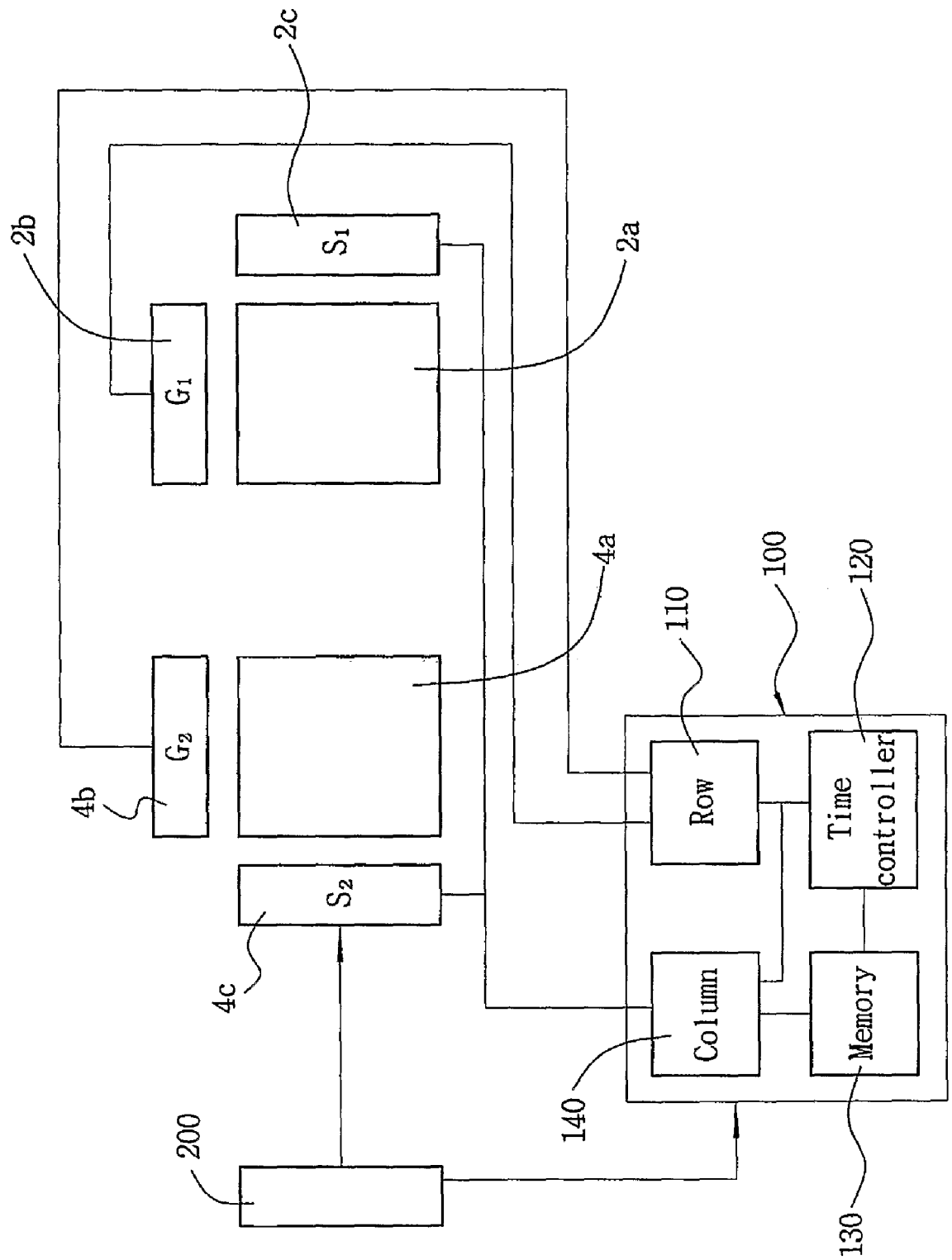
[Fig. 20]

[Fig. 21]
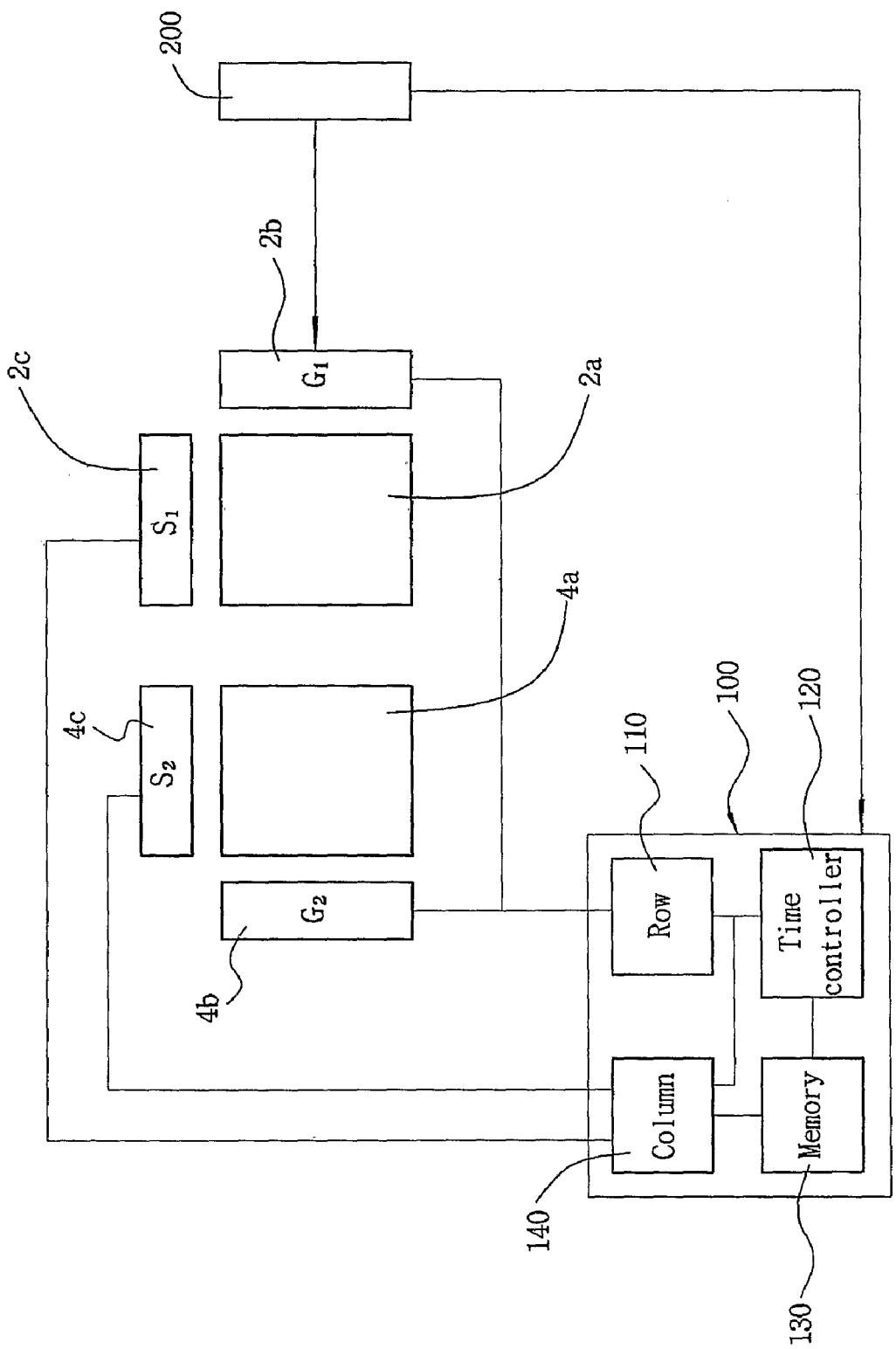

[Fig. 22]
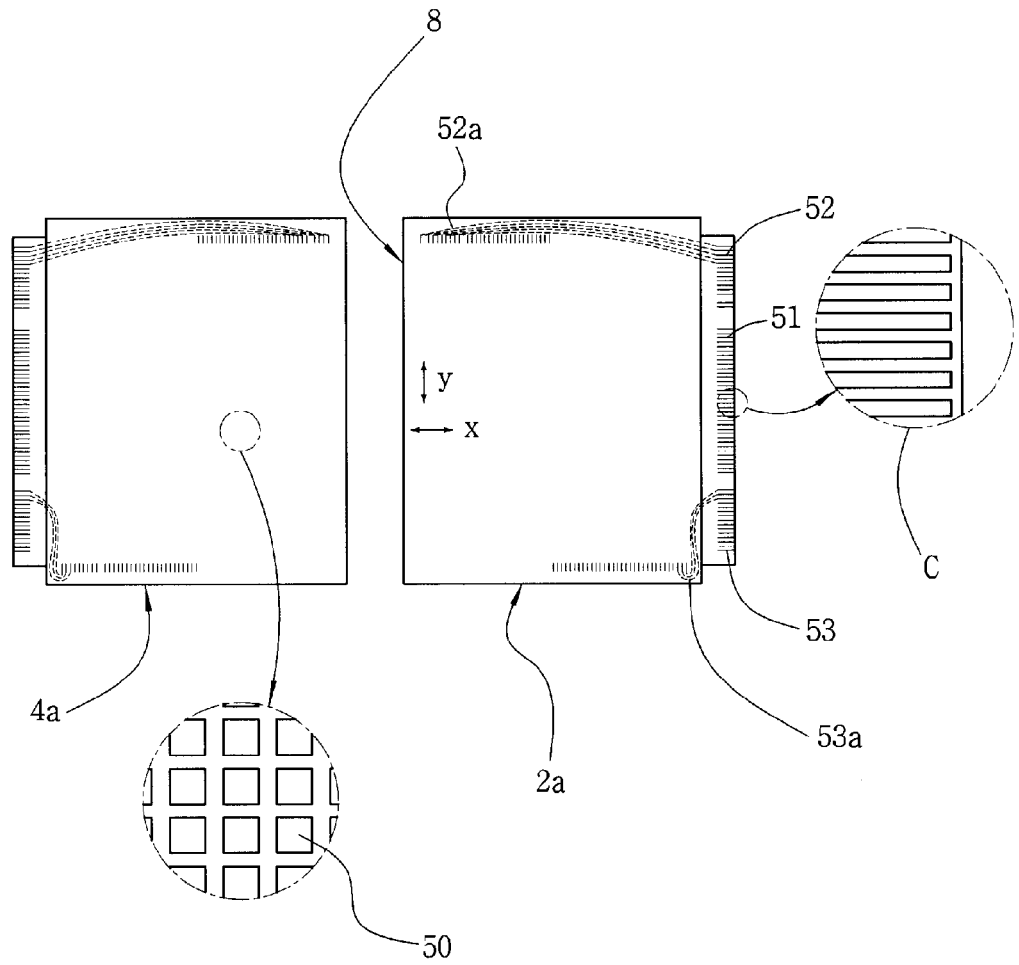
[Fig. 23]
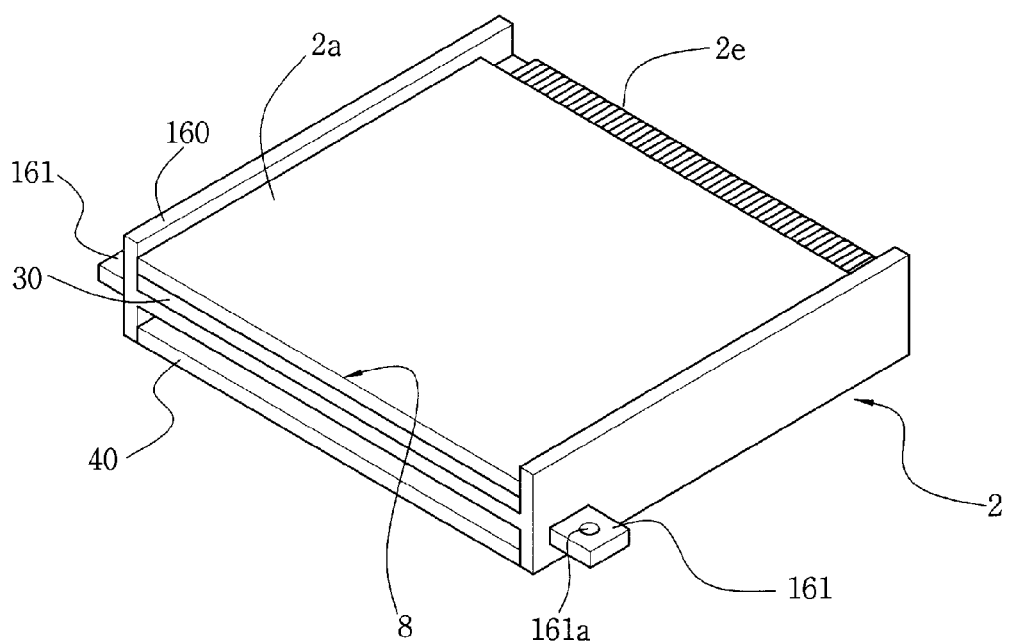

[Fig. 24]
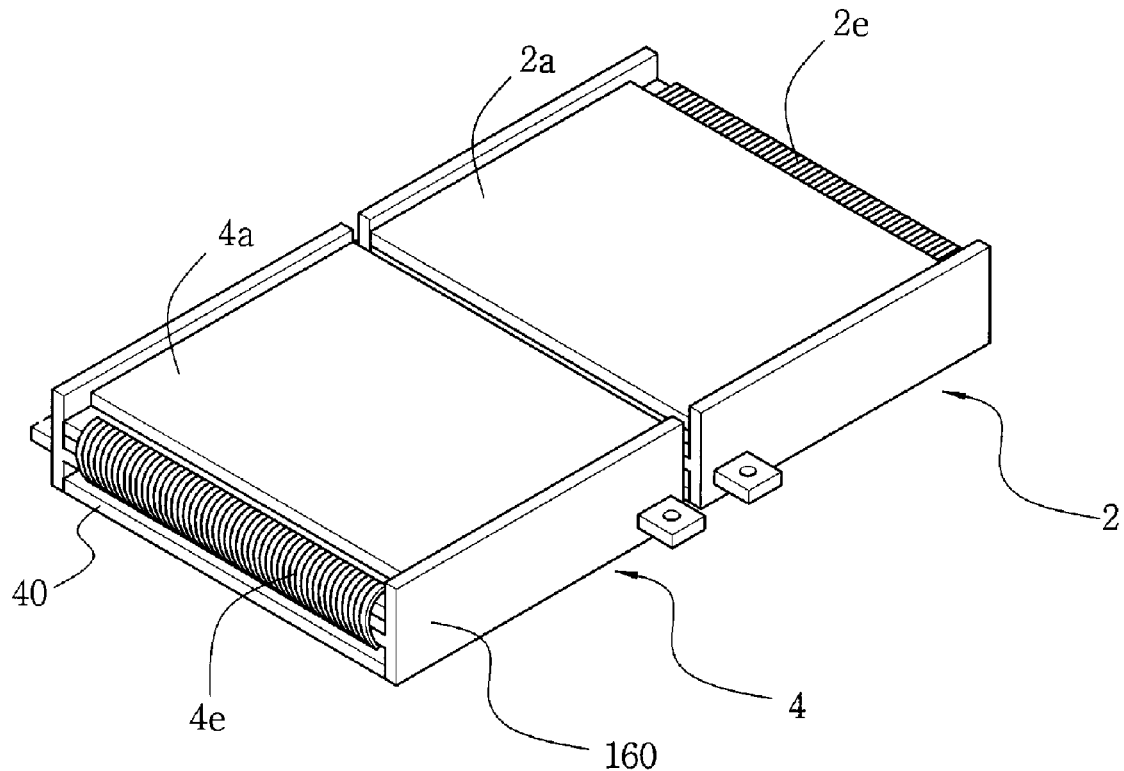
[Fig. 25]
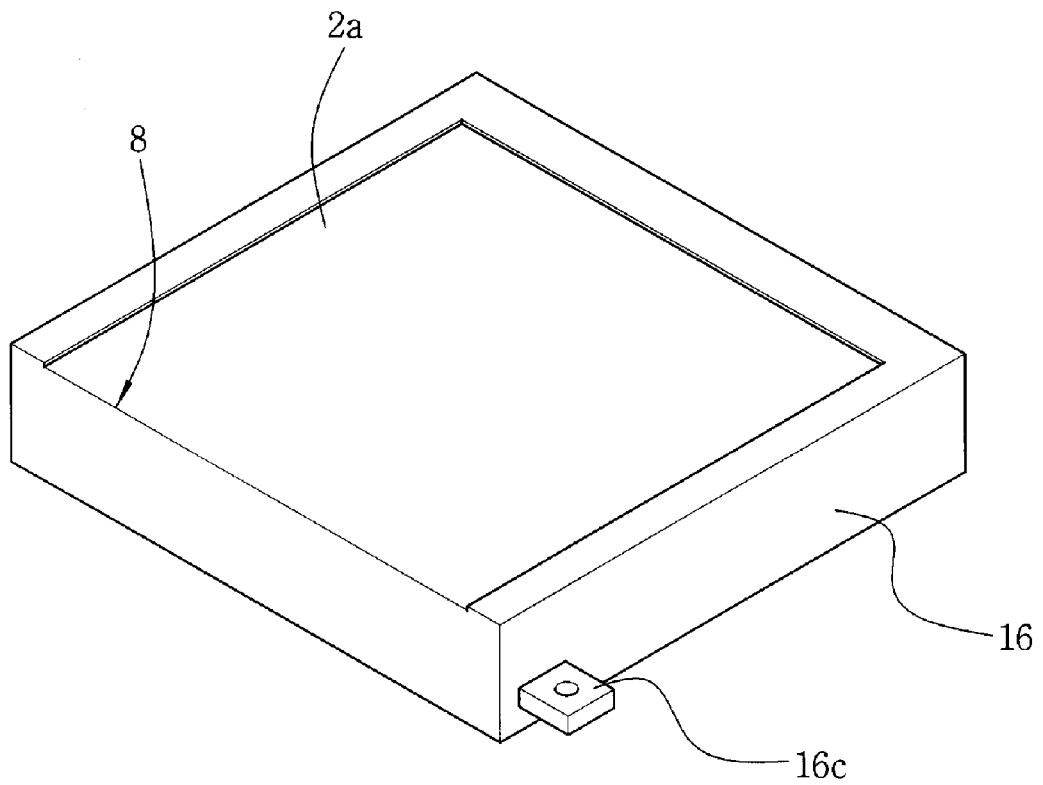

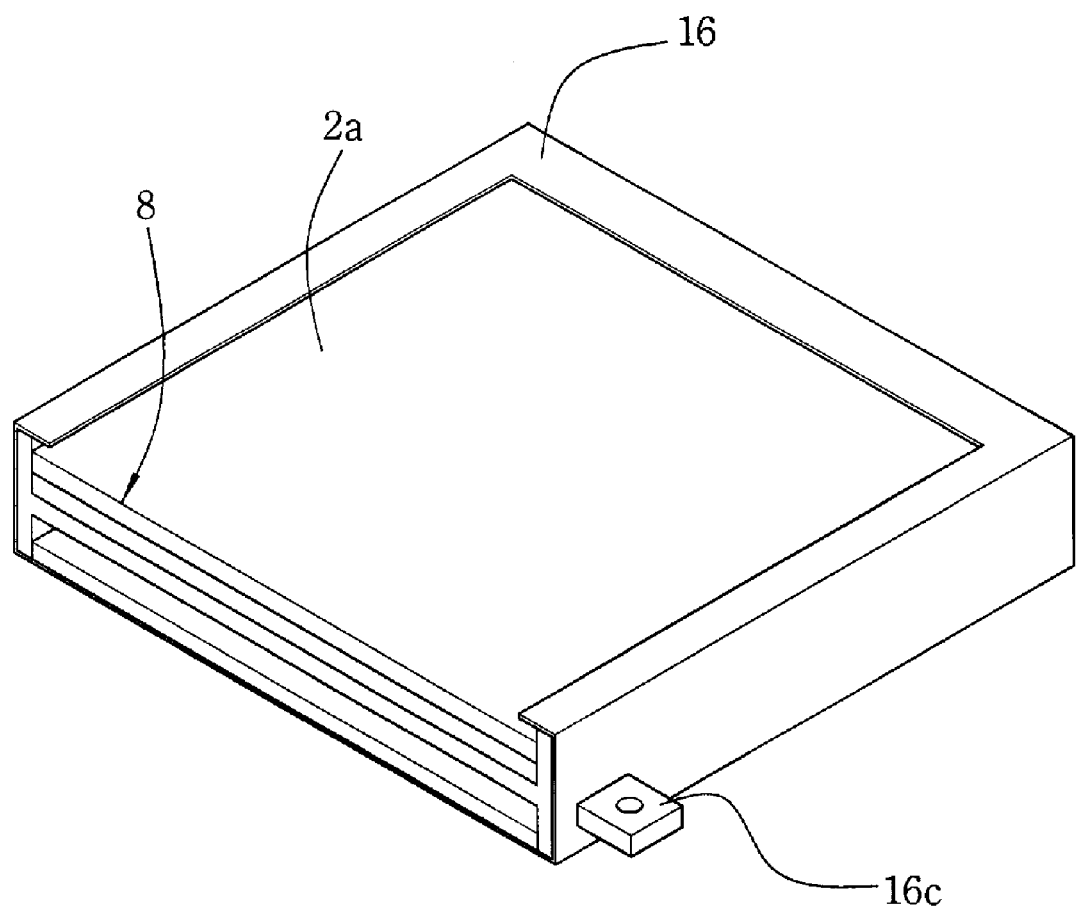
[Fig. 26]

PORTABLE DISPLAY DEVICE

CROSS-REFERENCE TO RELATED APPLICATION

This Application is a Section 371 National Stage Application of International Application No. PCT/KR2005/001623, filed May 31, 2005 and published as WO 2005/119409 on Dec. 15, 2005, in English.

TECHNICAL FIELD

The present invention relates to a foldable type portable display device that can realize the large-sized screen with plural display elements, and more particularly to a portable display device that optical elements provided on the top surfaces of display elements, respectively are arranged coming into contact each other when the display device is unfolded, thereby minimizing a non-display area on a joint portion between the adjacent display elements.

BACKGROUND ART

Conventionally, a technology for realizing a large-sized screen with two or more display elements was applied in a large display device. In recent years, as the mobile information system has been developed to have a wireless internet function, a need of the large-sized screen is more increased. However, the large-sized screen cannot meet the most of portable characteristics of the portable display device and then a foldable type portable display device is suggested.

Generally, as flat display elements used for the portable display device, a liquid crystal display (LCD), a thin film transistor (TFT)-LCD, a field emission display (FED), a plasma display panel (PDP), an electro luminescent (EL), an electronic paper and etc., have been used.

As a portable display device with multiple display elements, a foldable type display device is suggested for increasing portable characteristics. However, in a prior foldable type display device, when panel housings having display elements, respectively are unfolded, the display elements of the panel housings can not effectively come into contact each other. Furthermore, a fixing member and a chassis should be designed appropriately to the foldable display device.

DISCLOSURE OF INVENTION

Technical Problem

The present invention has been made in an effort to solve the problems described above and it is an objective of the present invention to provide a foldable display device that at least two foldable panel housing for receiving a display element may be folded or unfolded, the display elements coming into contact to form a single large size screen in the unfolded position of the panel housings.

Technical Solution

To achieve the above objective, the present invention provide a portable display device comprising;
at least two display elements;
at least two foldable panel housings for receiving and supporting the display elements, circuit boards and other parts, respectively; and wherein one sidewall of the panel housings are cut to form an cutting zone, so that an opposite sidewalls of the display elements may be adjacently disposed each other when the panel housings are unfolded.

The cutting zone of the panel housings is a connecting joint portion for allowing that the display panels may be adjacently disposed each other and when the cutting zone is an opening, a protecting member is provided at the opening.

The portable display device further comprises an optical element and the optical element is provided in a joint portion to reduce the width of the connecting joint portion.

The portable displace device may include a supporting member for supporting the display element, the supporting member is provided with a connecting joint portion It is preferred that when the display element is mounted on the chassis, the chassis is provided with a connecting joint portion, and the connecting joint portion of the chassis covers the sidewall of the display element only and is disposed at the joint portion of the panel housing.

It is preferred that total image data signals are preferably divided and transferred to the display elements.

According to another embodiment of the present invention, a portable display device is provided, comprising;
at lease two display elements;
at least two foldable panel housings for receiving and supporting the display elements, circuit boards and other parts, respectively; one sidewall of the panel housings being cut to form an cutting zone, so that an opposite sidewalls of the display elements may be adjacently disposed each other when the panel housings are unfolded; and
wherein the display element comprises a display panel and a circuit board, and an outer electrode for transferring data signals and common signals to the display panel is formed at the one side of the display panel.

It is preferred that the outer electrode formed at the display panel is disposed at a connecting joint portion or an opening formed in the panel housing when the display panel is mounted on the panel housing.

It is also preferred that the outer electrode of the display panel is disposed at a connecting joint portion of the chassis or a supporting member, when the display panel is mounted on the chassis or the supporting member.

Advantageous Effects

The present invention provides a foldable type portable display device for realizing the large-sized screen with a joint portion as a non-display area between two or more display panels is minimized.

According to the present invention, the non-display area as the joint portion may be compensate by means of an optical element, and the driving signals are divided and transferred to two display elements for realizing a single large-sized screen.

BRIEF DESCRIPTION OF THE DRAWINGS

FIGS. 1 and 2 are perspective views illustrating a foldable type portable display device according to the present invention;

FIGS. 3 to 5 are sectional views showing unfolded panel housings of a portable display device of the present invention;

FIG. 6 is an perspective view showing a portable display device in a partially unfolded position;

FIGS. 7 and 8 are perspective views showing a portable display device with a gap between display elements according to the present invention;

FIG. 9 is a plan view illustrating a portable display device of which the panel housings are unfolded;

FIGS. 10 and 11 are views illustrating an optical element;

FIG. 12 is a perspective view of a portable display device with a cover removed;

FIG. 13 is a sectional view of a portable display device with a panel housing unfolded;

FIGS. 14 to 16 are perspective views showing a supporting member for mounting a display panel assembly;

FIGS. 17 to 19 are views showing a chassis enclosing a display panel assembly;

FIGS. 20 and 21 are block diagrams of a driving circuit for driving two screens;

FIG. 22 is a view showing a display panel assembly with an outer electrode array;

FIGS. 23 and 24 are perspective views showing an outer electrode array provided at the opposite position to a joint portion of the supporting member; and FIGS. 25 and 26 are perspective views showing a supporting member mounted on a chassis.

MODE FOR THE INVENTION

Preferred embodiments of the present invention will be described more in detail hereinafter.

According to the present invention, a foldable type portable display device realizing a large-sized screen by adjacently arranging at least two flat display elements is provided. As flat display elements, a liquid crystal display (LCD), a thin film transistor (TFT)-LCD, a field emission display (FED), a plasma display panel (PDP), an electro luminescent (EL), an electric paper and etc., may be used.

To form a single large screen by adjacently arranging at least two flat display elements, at least one sidewall of the display elements should be coming into contact or be positioned within the distance of 4 mm, which means at least two display elements should be arranged enough adjacently to form a single screen.

According to the present invention, two flat display elements are jointed to each other for forming a large-sized screen.

FIG. 1 shows a foldable type portable display device according to the present invention.

The foldable type portable display device in FIG. 1 comprises two display elements 2 and 4 and two panel housings 20 and 40 for receiving the display elements. The panel housings 20 and 40 are provided with a circuit board for driving the display device and other parts.

The panel housings 20 and 40 are connected by a connecting member 6 such that the two panel housings can be folded or unfolded. A hinge is used as the connecting member 6 in this preferred embodiment.

FIG. 2 shows the display device according to the invention in folded position.

A cover 18 is provided at the adjacent opposite sidewalls of the panel housings for protecting sidewalls of the display elements 2 and 4.

FIGS. 3 to 5 are sectional views showing the unfolded panel housings.

As shown in FIG. 3, the display elements 2 and 4 are provided on the top of the panel housings 20 and 40, respectively and are adjacently disposed when the panel housings 20 and 40 are unfolded and the adjacent sidewalls thereof come into contact.

For more adjacent positioning of the two display elements 2 and 4 upon unfolding of the panel housings 20 and 40, the display elements 2 and 4 are disposed on the top of the sidewalls of the panel housings 20 and 40 coming into contact, when the panel housings 20 and 40 are unfolded. In this case, the sidewalls of the panel housings 20 and 40 are partially cut off to form an opening 8b so that the display elements 2 and 4 may be more adjacently disposed each other. The detail shape of the openings 8b are shown in FIG. 13.

Accordingly, when the panel housings 20 and 40 are unfolded, the display elements 2 and 4 may be more adjacently positioned due to the cut-off opposite sidewalls of the panel housings 20 and 40.

The respective panel housings 20 and 40 are provided with a circuit board 25 and 45 and a supporting member 26 and 46. Furthermore, a cap 24 is provided at the margin of the respective display elements 2 and 4. The cover 18 are not shown in the drawing for the simplicity of the drawing.

A common pivotal center A of the panel housings is positioned in the same plain as formed by the top surface of the cap 24. That is, the pivotal center A is disposed at the same height as that of the cap.

FIG. 4 shows another embodiment of the present invention with a protecting member 14. As seen in the drawing, the protecting member 14 is mounted on an uneven-layer 24a and 20c formed at the inner wall of the cap 24 and the panel housings 20 and 40 to cover and protect of the front corresponding to display area and sidewalls of the display elements 2 and 4. Also, the side portions of the protecting member 14 has preferably thinner thickness than that of the front portion of the protecting member 14, thereby minimizing a joint portion 8 as a non-display area.

The protecting member 14 comprises a front portion 14a for protecting a front surface of the display elements and a side portion 14b for protecting a sidewall of the display elements. The thickness of the side portion 14b is thinner than that of the front portion 14a. In the case the protecting member 14 is a film, if possible, it should be thin and strong. Accordingly, the protecting film is preferably a metal film or a synthetic resin film coated with a metal or a non-organic materials.

An optical element 27 may be provided under the protecting member 14 and the protecting member 14 may be integrated with the optical element 27. The optical element 27 may be a micro-prism or a micro-lens. In this case, the integration with the optical element 27 and the protecting member 14 means that the micro-prism or the micro-lens is provided on the underside of the protecting member 14. It is preferable that the protecting member has a thickness less than 1 mm, more preferably less than 0.5 mm.

FIG. 5 shows a display device where a connecting joint portion is provided at each of the sidewalls of the panel housings.

When the panel housings 20 and 40 are unfolded, the display elements 2 and 4 are adjacently positioned and the connecting joint portions 20a and 40a are disposed between the opposite sidewalls of the display elements 2 and 4. Accordingly, the connecting joint portions 20a and 40a block the openings 8b. That is, the display elements 2 and 4 may be adjacently positioned due to the openings 8b or the connecting joint portions 20a and 40a formed by cutting-off of the opposite sidewalls of the panel housings 20 and 40.

It is preferable that the connecting joint portions 20a and 40a are thinner than other area of the panel housings 20 and 40, more preferably less than 0.5 mm.

As shown in FIG. 3, the opposite sidewalls of the display elements 2 and 4 may be more adjacently positioned through the openings 8b formed at the sidewalls of the panel housings 20 and 40. In addition, as shown in FIGS. 4 and 5, the display elements 2 and 4 may be adjacently positioned within the distance of 2 mm to 3 mm due to the connecting joint portions 20a and 40a which are formed at the opposite sidewalls of the panel housings 20 and 40.

Therefore, the display elements 2 and 4 can be adjacently positioned to form in a single large sized screen.

FIG. 6 shows a display device with the panel housings are partially folded.

As shown in FIG. 6, when the panel housings are partially folded, a joint gap 8a is formed at the joint portion 8 adjacent to the opposite sidewalls of the display elements 2 and 4. As the joint gap 8a is a non-display area and becomes a drawback in the display device, it is preferable that a wide of the joint gap is as less as possible.

FIGS. 7 and 8 show an embodiment in which the joint gap is narrowly formed according to the present invention.

As shown in FIGS. 3 and 4, the panel housings 20 and 40 are folded or unfolded around the pivoting center A of the panel housings 20 and 40. Accordingly, the less the distance between the pivotal center A and the protecting member 14 or the optical element 27, the less the joint gap is. As shown in FIGS. 7 and 8, the protecting member 14 or the optical element 27 is spaced at the very reduced distance from the pivotal center A. Accordingly, as shown in the drawings, the distance between the pivotal center A and the protecting member 14 or the optical element 27 is preferable within 1 mm. The protecting member 14 or the optical element 27 is almost in accord with the pivotal center A or is spaced within the distance of 0.1 mm from the pivotal center A.

The distance mentioned above means the distance between the pivotal center A and the connecting joint portion 20a when the connecting joint portion 20a is formed, as shown in FIG. 7, and means the distance between the pivotal center A and the display elements 2 and 4 or the distance between the pivotal center A and the optical element 27 or the protecting member 14, as shown in FIG. 3.

FIG. 9 is a plan view showing a display device in the unfolded panel housings.

In the drawing, the opposite sidewalls of the display elements 2 and 4 come into contact with, thereby minimizing a width of the joint portion 8 of the display elements.

The circle in the drawing shows the expanded joint portion 8. The protecting member 14 or protecting film is provided between the display elements. Arrays of pixels 2n and 4n of the display elements, respectively are adjacently positioned to the joint portion 8. Sealants 2f and 4f are provided adjacent to the pixel arrays 2n and 4n. The sealants 2f and 4f are preferably provided at the position within 0.5 mm from the pixel 2n. It is preferable that the sealants are applied within the thickness range of 0.5 mm.

As the joint portion 8 is a non-display area in the display elements, as shown in FIG. 9, the non-display area corresponds to the area of the protecting member 14 or film, and sealants 2f and 4f. The non-display area is indicated by B in the drawing and the total non-display area is two times B. The protecting film may be a conventional metal film or synthetic resin for protecting the sidewalls of the display elements and the protecting film of synthetic resin is preferably coated with a metal, a non-organic material for reinforcement of strength.

To minimize the non-display area, the end portion of the optical element is preferably extended into the non-display area.

FIGS. 10 and 11 show the arrangement of the optical elements.

FIG. 10 shows an embodiment of the optical element for changing the path of the display light. The optical element comprises a light transmission member 27a of a transparent plastic material such as polyacrylate or polyethylene terephthalate (PET), a plurality of reflection members 27b provided in a light transmission member 27a for changing a direction of the display light and a diffusion plate 27c for dispersing the light.

As shown in the drawings, an inclination of the reflection member 27b in the optical element 27 may be obtained from the following formula (1);

$$\tan \alpha = A/B$$

wherein A is a distance between the top surface of the optical element 27 and the display panel 2; and B is the width of the non-display area as shown in FIG. 9.

Also, in case that the optical element 27 is provided with a micro-lens for magnification, the magnification ratio is determined considering the values of A and B.

FIG. 11 shows a distance from the display panel to the surface of the optical element.

The display panel includes an upper substrate 2i and a lower substrate 2j.

As shown in the drawing, the display light emitted toward the flat display elements 2 and 4 is initially transferred from an electrode assembly 2h, the distance from the display panel 2 to the surface of the optical element 27 becomes A'. Thus, the A in the formula (1) may be replaced by A'.

FIG. 12 shows a display device with the cover 18 exploded.

A recess 28 is formed at the sidewalls of the panel housings 20 and 40 for receiving the cover. The joint gap 8a is existed between the display elements 2 and 4. However, the joint gap 8a may be almost removed by minimizing the gap between the display elements 2 and 4.

In FIG. 12, the sidewalls of the display elements 2 and 4 are expressed in a dotted line, which means that the sidewalls of the display elements may be exposed or not. That is, the sidewalls of the display elements are exposed in the structure in FIG. 3, but are not exposed if the connecting joint portions 20a and 40a are formed as in FIG. 5. The cover 18 is adapted to move for allowing that the display elements come into contact each other when the panel housings 20 and 40 are unfolded.

FIG. 13 is a sectional view showing the folded panel housings.

The cover 18 and the recess 28 are omitted in FIG. 13 for simplicity of the drawing. In FIG. 13, the distances L1 and L2 from a pivotal center A to the display elements 2 and 4, respectively are the same. The distances D1 and D2 from the pivotal center A to the top ends of the sidewalls of the panel housings 20 and 40 for placing the display elements 2 and 4, respectively are also the same.

Accordingly, when the panel housings 20 and 40 are unfolded, the sidewalls of the display elements 2 and 4 come into contact or, are adjacently positioned.

The sidewalls of the display elements 2 and 4 may be exposed through the openings 8b, but the sidewalls of the display elements 2 and 4 are not exposed in the structure that the connecting joint portions 20a and 40a are formed at the sidewalls of the panel housings 20 and 40.

FIGS. 14 to 16 show a supporting member for mounting a display elements.

Generally, a display element comprises an display panel 2a, a driving circuit board 2b, a back light 30 and a supporting member 160. Therefore, the respective display elements 2 and 4 in FIGS. 2 to 4 includes a display panel 2a, and a supporting member 160 which is mounted with a driving circuit board 2b and a back light 30. A sidewall of the supporting member 160 corresponding to the joint portion 8 of the display element 2 is cut-off, thereby minimizing the non-display area. Also, the connecting joint portions 160e and 160f may be formed at the supporting member 160 to minimize the non-display area.

A fixing plate 161 and a screw hole 161a are formed at the supporting member 160 so that the supporting member 160 may be fixed to the panel housings 20 and 40, or a chassis 16. At this time, the connecting joint portions 160e and 160f are mounted at the joint portion 8 of the panel housings 20 and 40 so that the non-display area may be minimized.

FIG. 15 shows the supporting member 160 of which the sidewalls are cut and opened to form the connecting joint portions 160e and 160f.

FIG. 16 shows the supporting member with the connecting joint portions 160e and 160f formed by the thinner sidewalls thereof. The sidewalls are formed more thinner than other portions of the supporting member 160, so that the connecting joint portions 160e and 160f preferably have thickness within 0.3 mm. The connecting joint portions 160e and 160f are indicated in a dot line in FIG. 16 to express its thinner thickness.

The display panels 2a and 4a and a back light are mounted on a plate 160a of the supporting member 160.

FIGS. 17 to 19 show a display element enclosed by a chassis.

As shown in drawings, the display panel 2a and driving circuit board 2b and 2c are enclosed by the chassis 16. A conventional film type printed circuit board may be used as a driving circuit board. The display elements 2 and 4 in FIGS. 2 to 4 may mean a assembly of the display panel 2a, the driving circuit board 2b, the back light 30 and the chassis 16 for enclosing them.

The chassis means an enclosing member of a metal material such as aluminum for enclosing a display panel and a driving circuit board. At this time, the driving circuit board 2b and 2c may be provided on the supporting member 160 or the chassis 16 with an outer electrode 2k of the display panel 2a coupled thereto in a folded state. A size of the display element is reduced by coupling the outer electrode 2k to the respective upper panel 2i and lower panel 2j of the display panel 2a in a folded state.

FIG. 18 is a sectional view showing the structure that the display panel 2a, driving circuit and back light 30 are enclosed by the chassis 16. A portion of the chassis 16 corresponding to the joint portion 8 covers the sidewall of the display panel 2a only, but does not cover the upper portion of the display panel, thereby minimizing the non-display area.

The joint portion 8 means the bordering areas that the display elements 2 and 4 are adjacent to each other.

That is, a connecting joint portion 16a of the chassis, which the respective display elements 2 and 4 come into contact thereto, covers the sidewall of the display element. Also, the connecting joint portion 16a is designed to be thinner than other area of the chassis to minimize the non-display area.

The chassis 16 is provided with a fixing member for fixing it to the panel housings 20 and 40. At this time, the connecting joint portion is disposed at the joint portion 8 of the panel housings 20 and 40, thereby minimizing the non-display area.

FIG. 19 shows a chassis having an open type connecting joint portion.

The joint portion 8 is cut off to be opened, which the sidewalls of the display elements 2 and 4 contact thereto or closely adjacently positioned. Accordingly, as shown in FIG. 19, the connecting joint portion 16a is opened and the sidewalls of the display elements 2 and 4 are exposed.

FIGS. 20 and 21 are block diagrams of a driving circuit for driving two screens as a single screen.

The first and second display panels 2a and 4a are connected to a first and second source driving driver 2c and 4c, and to a first and second gate driving driver 2b and 4b, respectively.

A signal outputted from display device is transmitted to a field programmable gate array (FPGA) 100. The FPGA(100) includes a row data processing section 110, a column data processing section 140, a memory device 130 and a timing controller 120. And a power supply source 200 is connected to the FPGA.

A driving signal from the column data processing section 140 is transmitted to the source driving driver 2c and 4c, and a driving signal from row data processing section 110 is transmitted to the gate driving driver 2b and 4b. The respective driving drivers are connected to the display panel 2a for displaying an image thereon. The timing controller 120 controls the synchronization of the signals from the source driving driver and gate driving driver.

The signal from the source driving driver may be a data signal and the signal from the gate driving driver may be an common signal.

As shown in FIGS. 20 and 21, to drive the two display panels 2a and 4a, the source driving driver 2c and 4c, and the gate driving driver 2b and 4b should be connected to the display panels 2a and 4a, respectively and a driving signal is transmitted to the source driving driver 2c and 4c and the gate driving driver 2b and 4b, respectively.

FIG. 20 is a block diagram showing the same signal is supplied to the first and second source driving driver 2c and 4c for supplying data signals to the display panels 2b and 4b. The first gate driving driver 2b and the second gate driving driver 4b are time-divided and the common signal is supplied to the first gate driving driver 2 first, and secondly the common signal is supplied to the second gate driving driver.

On the other hand, in the block diagram in FIG. 21, the same data signal is supplied to the first and second gate driving driver 2b and 4b, respectively for supplying common signals to the display panels 2a and 4a. Accordingly, the data signal is divided and the respective divided signals are supplied to the first and second source driving drivers 2c and 4c.

For example, when the respective first and second display panels 2a and 4a are linked to the source driving drivers via the number of n electrode lines, the total data lines are 2n for two integrated display panels. An image signal memoried in the memory device 130 is divided and the divided data signals of the 1st line to (n)th data line are supplied to the first source driving driver 2c, while the divided signals of the (n+1)th line to (2n)th line are supplied to the second source driving driver 4c.

Accordingly, when the driving signals is supplied to the respective display panels 2a and 4a, the display panels 2a and 4a are driven to reproduce a single image.

Furthermore, it is possible to combine the driving methods illustrated in the block diagrams in FIGS. 20 and 21 for driving the display panels. That is, it is possible to supply the time-divided data signals to the first and second source driving drives 2c and 4c together with supplying the time-divided common signals to the first and second gate driving drivers 2b and 4b. And the gate driving driver and the source driving driver may be made in a single integrated chip. Therefore, the drawings illustrated in the present invention are example configurations of the circuit for driving two display panels in single large sized screen.

FIG. 22 shows an outer electrode array of the display element.

Typically, a driving drive I.C. may be coupled to the outer electrode arrays 51, 52 and 53 of the display panels 2a and 4a.

As shown in the drawing, a plurality of pixels 50 are arranged in the display panel and the respective positions of the pixels are represented in the x-y coordinates. For driving the pixels, the outer electrodes are drawn out from the two sides of the display panel having the four sides. However, for the production of on a large scale and a competitive price, a single driving drive I.C with a single integrated chip may be used.

As shown in FIG. 22, the electrode array 51 in the x axis is drawn out from one side of the display panel, while the electrode array in the y axis is divisionally drawn out from the two opposite sides of the display panels and the divisional two electrode arrays 52 and 53 are arranged in the same direction of the x axis electrode array via two coupling electrode arrays 52a and 53a. The coupling electrode arrays 52a and 53a are roughly shown in the drawing for the simplicity thereof. The outer electrode arrays are enlarged by circle C.

As the outer electrode is arranged at one side of the display panel 2a and 4a, the driving driver for transferring the data signal and common signal which is formed in a single integrated circuit chip, are coupled to the display panel.

In this case, it is preferred that the outer electrode for transferring the data signal and common signal is disposed at the side opposite to the side where the joint portion 8 between the two display panels 2a and 4a is located.

FIGS. 23 and 24 are views showing another embodiment of the display device according to the present invention, where the outer electrode is provided at the side opposite to the joint portion of the supporting member.

FIG. 23 shows the outer electrode 2k comprising the outer electrode arrays 51, 52 and 53 for coupling the driving driver supplying the data signal and common signal to the display panel 2a. The electrode 2k is disposed at the opposite side to the joint portion 8 of the supporting member 160. The coupling electrodes 52a and 53a, or the outer electrode array 51, 52 and 53 are not disposed at the joint portion 8 of the display panel 2a, thereby minimizing the non-display area.

A circuit coupler 2e is coupled to the outer electrode 2k for transferring the signals from the driving circuit to the display panel. The supporting member 160 is mounted on the panel housings 20 and 40 or on the chassis 16 by the fixing plate 161 with a screw hole 161a.

The circuit coupler 2e is disposed at the opposite side to the joint portion 8 to minimize the width of the joint portion 8.

Although the sidewall of the display panel 2a is exposed at the side of the joint portion 8 of the supporting member 160, if necessary, such exposure may be prevented or the synthetic resin may be applied at the sidewall of the display panel or back light for its protection.

FIG. 24 shows two supporting members symmetrically assembled each other. When the panel housings 20 and 40 are unfolded, the supporting members 160 with the display panels 2a and 4a are symmetric around the joint portion 8.

As shown in the drawing, the outer electrodes 2k of the display panel 2a in the supporting member 160 are located at the opposite side to the joint portion 8, and the display panel 2a is coupled to the driving circuit board via the circuit couplers 2e and 4e.

FIGS. 25 and 26 show the chassis wherein the supporting member is mounted thereon.

As shown in the drawings, the upper portion of the joint portion 8 in the chassis 16 is not covered, but the side is covered. The sidewall of the chassis around the joint portion is thinner than other area thereof. Therefore, the non-display area may be minimized.

Also, as shown in FIG. 26, the sidewall of the chassis 16 around the joint portion may be opened, so that the sidewall of the display panel 2a is exposed. In this case, a protecting layer of synthetic resin is applied the sidewalls of the display panels 2a and back light.

Furthermore, when the display panel 2a is mounted on the chassis 16, as shown in the drawing, the outer electrode 2k where the electrode arrays 51, 52 and 53 for transferring the data signals and common signals are provided therein is arranged at the opposite side to the joint portion 8 of the chassis 16. However, the outer electrode 2k is covered by an upper portion of the chassis 16.

The chassis 16 may be mounted on the panel housing by means of a chassis fixing plate 16c.

When the connecting joint portion of the supporting member 160 or chassis 16 are assembled in the openings or the connecting joint portion of the panel housing 20 and 40, and thus the outer electrode 2k is disposed at the connecting joint portions 20a and 40a or opening 8b of the panel housing 20 and 40.

When the display panels 2a and 4a are mounted on the panel housings 20 and 40, both the supporting member 160 or chassis may not be used. That is, the supporting member and chassis are merely an protecting member which may be integrated as a module for display panel and circuit board. The supporting member may be commonly made of plastic materials and the chassis may be made of metal such as aluminum.

INDUSTRIAL APPLICABILITY

As described above, the present invention provides a foldable type portable display device for realizing the large-sized screen with the joint portion as non-display area between the two or more display panels is minimized.

According to the present invention, the non-display area as the joint portion may be compensate by means of the optical element, and the driving signals are divided and transferred to the two display elements for realizing a single large-sized screen.

The invention claimed is:

1. A portable display device comprising: at lease two display elements; at least two foldable panel housings for receiving and supporting the display elements, circuit boards and other parts, respectively; and wherein one sidewall of the panel housings are cut to form an cutting zone, so that an opposite sidewalls of the display elements may be adjacently disposed each other when the panel housings are unfolded, wherein the display device further comprises an optical element, and the optical element is provided in a joint portion adjacent to the opposite sidewalls of the display elements to reduce the width of the joint portion.

2. A portable display device of claim 1, wherein the cutting zone of the panel housings allowing the opposite sidewalls of the display elements to be adjacently disposed is a connecting joint portions.

3. A portable display device of claim 2, wherein the cutting zone is an opening and a protecting member is provided at the opening.

4. A portable display device of claim 1, wherein the display device further comprises a supporting member for supporting the display element, the supporting member is provided with a connecting joint portion.

5. A portable display device of claim 4, wherein the connecting joint portion of the supporting member is disposed in a joint portion the panel housing.

6. A portable display device of claim 1, wherein the display element is mounted on the chassis and a chassis is provided with a connecting joint portion.

7. A portable display device of claim 6, wherein the joint portion of the chassis covers the sidewall of the display element only.

8. A portable display device of claim 6, wherein the connecting joint portion of the chassis is disposed at a joint portion of the panel housing.

9. A portable display device of claim 1, wherein total image data signals are divided and transferred to the display elements.

* * * * *

UNITED STATES PATENT AND TRADEMARK OFFICE
CERTIFICATE OF CORRECTION

PATENT NO.        : 7,548,415 B2                                           Page 1 of 1
APPLICATION NO.   : 11/597921
DATED             : June 16, 2009
INVENTOR(S)       : Si-Han Kim It is certified that error appears in the above-identified patent and that said Letters Patent is hereby corrected as shown below:

Title Page Under (76) Inventor:
Change "Hi-San Kim" to --Si-Han Kim--

Signed and Sealed this
Twenty-eighth Day of December, 2010

David J. Kappos
*Director of the United States Patent and Trademark Office*